April 3, 1945. J. C. ROGERS ET AL 2,372,796
LINTER
Filed April 22, 1942 2 Sheets-Sheet 1
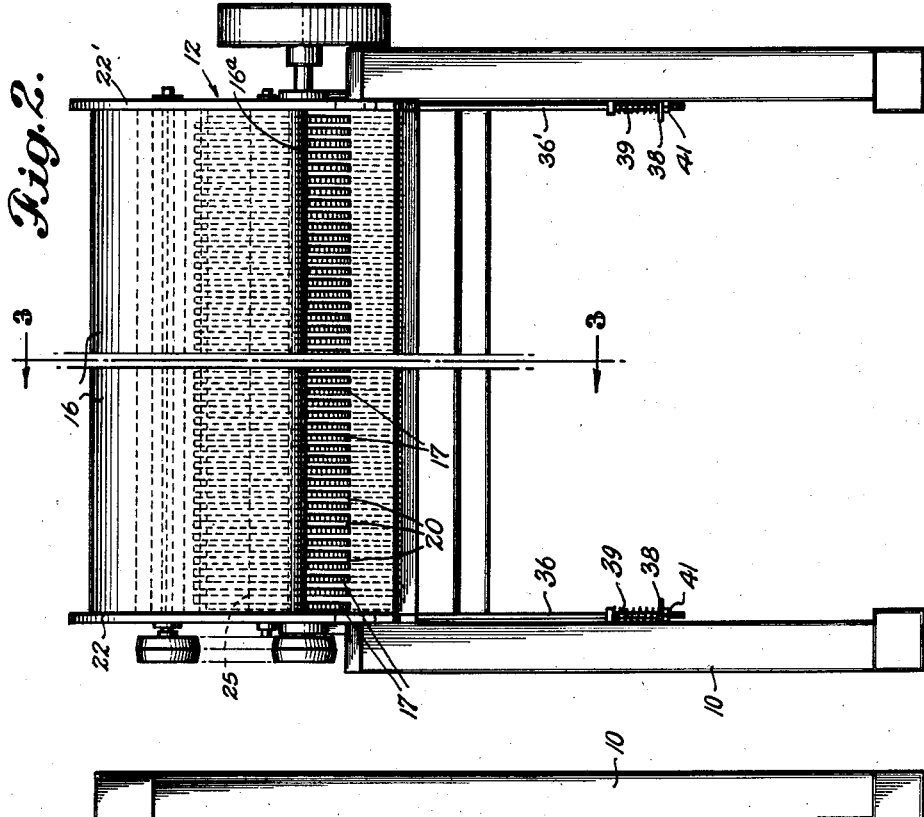
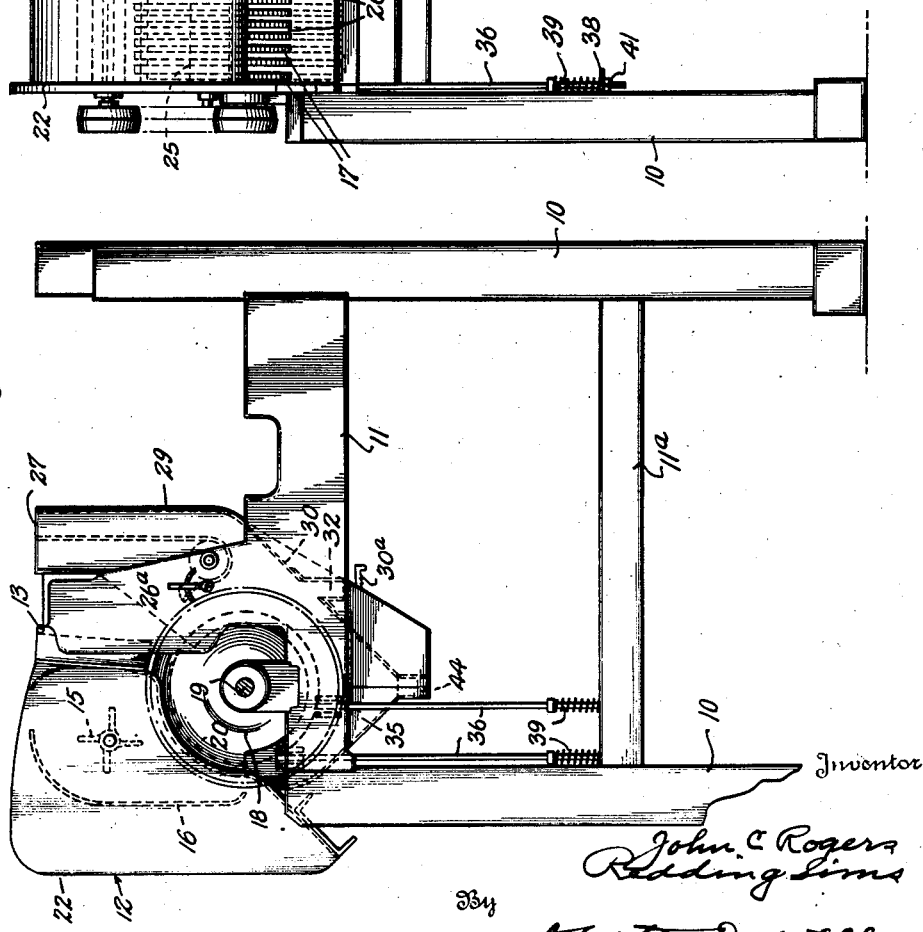

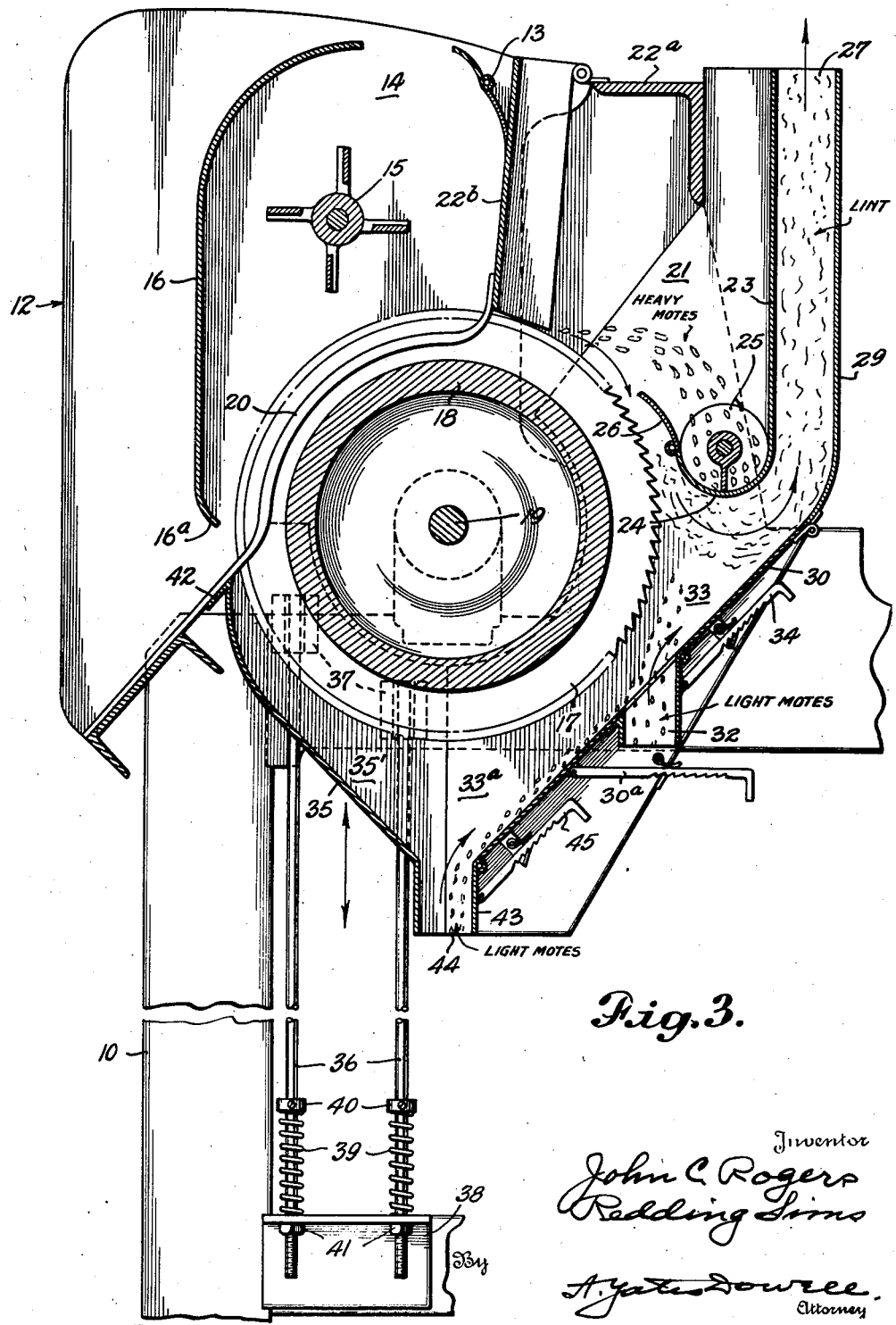

Patented Apr. 3, 1945

2,372,796

UNITED STATES PATENT OFFICE 2,372,796

LINTER

John C. Rogers and Redding Sims,
New Orleans, La.

Application April 22, 1942, Serial No. 440,044

9 Claims. (Cl. 19—59)

This invention relates to cotton seed linters broadly, and is particularly concerned with linters of the brushless type utilizing suction or an air blast to remove the lint direct from the linter saws.

Cotton gins of the brushless air blast type have been proposed in many and varied forms for over a relatively long period of time, but attempts to adapt the air blast principle to cotton seed linters have been heretofore unsuccessful from a commercial or industrial standpoint. This is apparently due to the differences in characteristics of the product operated upon and the matter to be separated from the product. The material which goes to a cotton gin for ginning is commonly termed "seed cotton," and generally speaking, out of every twelve to fourteen hundred pounds of seed cotton subjected to ginning, there will be obtained a five hundred pound bale of lint cotton, the remainder being commercial cotton seed. This cotton seed will have a residue of lint thereon of from approximately ten to thirteen per cent, which when removed is known as "cotton linters."

It is common practice to remove residue lint in two operations, viz: by passing the commercial cotton seed through first and second cut linters. The length of the staple in first cut lint is dependent upon the amount taken off, and usually the smaller amount is removed during this operation. It is virtually impossible in the second cut linter (or battery of linters) to remove lint down to say 2% of the amount remaining on the seed without cutting off some of the hull from the seed and sawing through certain of the seeds, thus liberating meats and shale which are part of but lighter than the seed and are termed "motes." Naturally the second cut lint has a much shorter staple than the first cut lint and far shorter than the staple cotton which was removed at the gin. Thus in the original ginning operation, the staple being longer, tends to hang in the teeth of the revolving saws with considerable tenacity, and when the gin is of the air blast brushless type, it requires a strong blast of air applied at a certain proper point and in the proper direction to remove the staple from the saw teeth. In most air blast gins, this is accomplished by means of a nozzle or jet arrangement applying air under high pressure and at a high velocity. The jet of air, also acting as a venturi, enters the take-off duct and conveys the cotton to the condenser at the baling press. In delinting cotton seed, and particularly in removing second cut lint, such a strong blast of air as is required in a cotton gin is not needed nor could it be used, since it would remove motes along with the lint.

In the conventional linter utilizing a brush in conjunction with the linter saws, the motes together with the lint are blown downward by the brush, and when they reach the moting space defined by the mote board and draft shield, the mass tends to revolve and the heavy particles are thrown to the outside and drop downward and pass out to a point of disposal, while the lighter lint passes upwardly through the space between the brush and mote board and to the rear of the linter, where it is blown on to a condenser or into a suction flue or duct, depending upon the type of system in use. When the brush is removed from the linter and air blast or suction is depended upon to separate the lint from the motes, difficulties arise in properly applying the suction to the area adjacent the saws and in which area the motes together with the lint detached from the seeds by the saws move in undergoing the process of separation.

The present invention utilizes suction of sufficient intensity to entrain the light lint and motes and get them away from the saws and then causes the mass to enter a moting whirl, the heavier particles falling to the outside of the mass and then down and out while the lighter lint passes up the flue through which suction is applied. The improved linter may therefore be termed a "multiple-moting linter" since it provides a second, and if desired, a third moting area or space wherein all foreign matter and motes may be eliminated from the lint. To provide these plural moting spaces or areas and to insure effective separation at these points, a particular structure has been evolved which results in separation efficiency comparing favorably with the more complicated and expensive brush type linters.

Objects of the present invention, therefore, include the provision of a cotton seed linter of the brushless type which will compare favorably in efficiency with machines of the brush type and at the same time is of simplified construction and operates at reduced overhead costs. In attaining these objects, we provide an improved linter with a first moting space which is substantially unaffected by, or is closed off from, the air blast or current and at which point separation of the heavier motes is attained by centrifugal force resulting from rotation of the saws; the lighter lint, smaller particles and lighter shale entrained in the saws pass downwardly from this moting space to a second moting space, at which point the mass enters into a whirl and the lighter shale and remaining motes are thrown out while the air current acts to convey the lint upwardly and outwardly through the linter flue. The parts of the machine are so constructed and arranged that an additional moting space or spaces may be provided in which separation is carried out in a manner substantially similar to that described in connection with the second moting space.

In constructing the present improved linter with the foregoing operations in view, additional advantages are brought about including adjustability of the moting areas with respect to the saws to attain most efficient separating action with a minimum amount of air suction; ease in removal and replacement of the saws, and other features of improvement in view of the following description taken in conjunction with the drawings, wherein:

Figure 1 is a view in end elevation of a linter in accordance with the invention;

Fig. 2 is a front elevation thereof;

Fig. 3 is a view in section taken substantially on the line 3—3 of Fig. 2.

Referring to the drawings in detail, the linter is illustrated as being supported by vertical frame members 10 and horizontal connecting members 11 and 11a. Mounted on this frame structure is a housing 12 which is hinged at 13. This housing provides a linter breast defining a hopper 14 in which is mounted the agitator or "float" 15. The outer wall 16 provides a seed board which at its lower edge is deflected inwardly as at 16a to catch the seeds detached from the lint by the saws 17 and which are mounted on a saw cylinder 18 carried by a shaft 19. A plurality of ribs 20 are mounted in the linter breast between which the saws 17 rotate in a clock-wise direction. The housing 12 including the float 15, and ribs 20 may be swung upwardly to gain access to the saws 17 for removal and replacement whenever the latter need sharpening or for other purposes.

The foregoing parts are more or less conventional in cotton seed linters generally.

To the right of the linter breast is a space 21 (note particularly Fig. 3) herein termed the first moting space and which is defined by the side walls 22 and 22' of the machine housing, top angle frame member 22a, rear wall 22b of housing 12 and a wall 23 shaped at its lower extremity to define a conveying trough 24 in which is mounted a screw conveyor 25. A baffle 26 is hinged to the trough 24 and has its upper free edge positioned relatively close to the peripheries of the rotating saws 17, said baffle being adjustable by lever and ratchet assembly 26a (Fig. 1) to determine the spacing between said edge and saws.

A suction flue 27 is provided and is defined in part by the wall 23 and a rear wall 29, the latter having hinged to the lower edge thereof a mote board 30, the said board being provided with an adjustable latch 30a whereby its position with respect to the saws 17 may be readily determined. This mote board is also provided with a discharge pocket or outlet 32 adapted to receive the lighter motes thrown outwardly from the whirling mass of lint and motes produced in a second moting space indicated at 33, said outlet being adjustable by ratchet lever 34.

An air shield or draft board 35 is provided and in conjunction with the mote board 30 defines a third moting area 33a beneath the saws 17. This air shield or draft board together with the side walls 35' thereof is supported by pairs of vertical rods 36 and 36' which at their upper ends are secured in brackets 37 attached to the side walls 35' and at the lower ends are screw threaded and project for free movement through brackets 38. Springs 39 are mounted on the lower ends of the rods 36, 36' and are adjustable through the medium of collars 40, the said rods being provided with adjusting stop nuts 41 on the lower ends thereof adapted to abut against the brackets 38.

The springs 39 normally exert an upward thrust on the rods 36, 36' which carry the draft board or air shield 35, and by adjusting the nuts 41, the position of this board with respect to the saws 17 may be readily determined. It will be noted that the upper edge of the draft board 35 is provided with a deflector 42 which normally abuts the undersides of the ribs 20 and lies close to the peripheries of the saws to cause entering air currents to flow between and closely around the saws.

Whenever it is desired to remove the saws for sharpening purposes, the draft board 35 may be depressed against the resistance of the springs 39, to prevent damage to the saw teeth or draft board.

The lower extremity of the draft board 35 coacts with a board 43 hinged to the lower edge of the mote board 30 to provide an additional outlet 44 for light motes, the size of said outlet being adjustable by means of ratchet lever 45.

The following is a brief description of the theory of operation of the improved linter:

Cotton seed deposited in the hopper 14 in which the agitator or float 15 rotates is subjected to the action of the saws 17 which strip the lint from the seeds at this point and pull the latter together with a certain amount of foreign matter or motes through the ribs. There is relatively little stir of air within the first moting space 21, and it is at this point that the heavy motes or particles are thrown outwardly by the centrifugal action of the saws into the trough 24, where they are conveyed to a point of deposit by the conveyor 25. The lighter motes and shale which are more difficult to separate from the lint are carried around by the saws to the second moting space 33. This space is subject to the suction exerted through the draft conduit 27, and this suction combined with the rotation of the saws causes the mass to enter into a whirl, the lighter shale and remaining motes being thrown outwardly from this whirling mass against the mote board 30 and into the pocket 32 while at the same time the suction draft withdraws the lint upwardly through the conduit 27. The space 33a may be termed the third moting space since at this point the mass continues to whirl with the consequent discharge of extremely light motes.

It is of advantage to adjust the draft board or shield 35 so as to restrict the space beneath the saws at this point and cause the air to enter the suction system in close proximity to the saws and thereby entrain lint or "lint fog" that might tend to otherwise hang in said space. Hence it is desirable that there be an easy and quick adjustment for this board. By lowering this board when removing the saws, danger to the teeth of the latter is obviated, while at the same time the board will always come back to its original position without repeated adjustment.

The conveyor 25 for the heavy motes affords a means for conveying the motes to a point of deposit for easy handling and since these motes are separated from the remaining finer motes and shale, they have a greater sales value. Thus the machine affords a means for grading the motes as the latter are separated from the lint. Since the first moting is carried out in practically still air, there will be less air entering the suction system from above the saw, with the consequent reduction in cross currents tending to deflect motes from the tangential path in which they are thrown by the saw. This also results in less air entering the system.

The velocity of the air applied through the conveyor conduit 27 should be sufficient to entrain the lint from the moting areas 33, 33a but not carry the shale and light motes therewith; and due to the fact that part of the moting operation is carried out mechanically or by the centrifugal action of the saws and there is very little leakage of air above the saws as a result of the baffle 26, there is a consequent reduction in the amount of air required with a resultant reduction in horsepower and which may be an important factor where a battery of linters are in use.

It is preferred to adjust the baffle 26 so that its upper edge lies close to the peripheries of the saws 17, although this spacing may be readily gauged to obtain the most efficient results since the baffle may be adjusted while the machine is in operation. The mote board may be adjusted to make the second moting space relatively small and at the same time make the mote board steep resulting in less chance of "heavies" going along with the lint.

The foregoing and other important advantages not mentioned result from the construction of our improved linter and it will be understood that certain changes in construction and design may be adopted in attaining these advantages without departing from the spirit or scope of the invention as defined by the appended claims.

What is claimed is:

1. In a cotton seed linter having a saw cylinder carrying a plurality of saws and a linter breast provided with a series of ribs through which the saws rotate to strip the lint from the seed, means providing a discharge for seeds from said breast, housing means providing a moting space around the saws beyond said linter breast and terminating adjacent said seed discharge outlet, said housing means including a draft board or air shield having an edge portion located adjacent the seed discharge outlet to restrict the space at this point between the saws and said shield, and means resiliently mounting said draft board whereby the latter may be depressed clear of the saws to facilitate removal and replacement of the latter without damaging the saws and/or shield, the latter automatically returning to its original set position after release.

2. In a cotton seed linter having a saw cylinder carrying a plurality of saws and a linter breast having a series of ribs through which the saws rotate to strip the lint from the seed, means hingedly mounting said linter breast, housing means providing a moting space around the saws beyond said linter breast including a mote board and a draft shield, means for adjusting said board and shield with respect to said saw to control the area of the moting spaces, resilient means mounting the draft shield and whereby the latter may be lowered clear of said saws to facilitate removal and replacement of the saw cylinder without disturbing the adjustment of the shield.

3. In a cotton seed linter, a housing, a saw cylinder carrying a plurality of saws rotatably mounted in said housing, a lint conveyor conduit operating by means of an air blast communicating with said housing, said housing including a draft shield having an edge portion spaced relatively close to the peripheries of said saws to restrict the air blast to an area close around the saws, means resiliently supporting said shield whereby the latter may be depressed to facilitate the removal of the saw cylinder and saws, and means for adjusting position of said shield with respect to the saws.

4. In a cottonseed linter employing a plurality of saws mounted thereon together with a linter breast with a series of ribs between which the saws extend and are adapted to be rotated to strip lint from seeds, a wall structure providing a substantially open space to the rear of said breast around said saws, a lint tube associated with said space and having an inlet opening at approximately the level of the axis of said saws, suction means applied to said tube for drawing lint upwardly therein, a heavy mote receiver unit mounted within said space above the level of the axis of said saws, said unit constituting the upper wall of said inlet opening and defining a heavy moting space to which heavy motes are discharged from the saws by centrifugal force, said wall structure extending in an inclined direction downwardly from said unit, said wall structure terminating at its lower end in a lighter mote discharge opening.

5. In a cottonseed linter employing a plurality of saws mounted thereon together with a linter breast with a series of ribs between which the saws extend and are adapted to be rotated to strip lint from seeds, a wall structure providing a substantially open space to the rear of said breast around said saws, a lint tube associated with said space and having an inlet opening thereinto at approximately the level of the axis of said saws, suction means applied to said tube for drawing lint upwardly therein, a heavy mote receiver and conveyor unit mounted within said space above the level of the axis of said saws, said unit constituting the upper wall of said inlet opening and defining a heavy moting space to which heavy motes are discharged from the saws by centrifugal force, said wall structure extending in an inclined direction downwardly from said unit baffle, said wall structure terminating at its lower end in a lighter mote discharge opening including an adjustable air inlet baffle therefor whereby said space formed by said wall structure constitutes a chamber having three independent moting areas.

6. In a cotton seed linter employing a saw drum and a plurality of saws mounted thereon together with a linter breast with a series of ribs between which the saws extend and are adapted to be rotated to strip lint from seeds, a wall structure providing a substantially open space to the rear of said breast around said saws and drum and extending from the top of said breast to the bottom thereof, a lint tube associated with said space and having an inlet opening thereinto at approximately the level of the axis of said saws, suction means applied to said tube for drawing lint upwardly therein, a heavy mote receiver and conveyor unit mounted within said space above the level of the axis of said saws, said unit constituting the upper wall of said inlet opening and defining thereabove a heavy moting space to which heavy motes are discharged from the saws by centrifugal force and further defining between the saw drum and the mote receiver an air draft passage through which air is drawn in the direction of rotation of said saws, said wall structure extending in an inclined direction downwardly from the top of said breast and defining an air passage between itself and the saw drum in which air is drawn past the saw teeth in a direction opposite to the direction of rotation of said saws.

7. In a cottonseed linter employing a saw drum and a plurality of saws mounted thereon together with a linter breast with a series of ribs between which the saws extend and are adapted to be rotated to strip lint from seeds, a wall structure providing a substantially open space to the rear of said breast around said saws and drum and extending from the top of said breast to the bottom thereof, a lint tube associated with said space and having an inlet opening thereinto at approximately the level of the axis of said saws, suction means applied to said tube for drawing lint upwardly therein, a heavy mote receiver and conveyor unit mounted within said space above the level of the axis of said saws, said unit constituting the upper wall of said inlet opening, said receiver including a baffle, said baffle extending from said wall structure at a point above the axis of said saws around said conveyor and upwardly toward said saws and defining thereabove a heavy moting space to which heavy motes are discharged from the saws by centrifugal force and further defining between the saw drum and the baffle an air draft passage through which air is drawn in the direction of rotation of said saws, said wall structure extending in an inclined direction downwardly from said unit baffle and defining an air passage between itself and the saw drum in which air is drawn past the saw teeth in a direction opposite to the direction of rotation of said saws.

8. In a cottonseed linter employing a saw drum and a plurality of saws mounted thereon together with a linter breast with a series of ribs between which the saws extend and are adapted to be rotated to strip lint from seeds, a wall structure providing a substantially open space to the rear of said breast around said saws and drum and extending from the top of said breast to the bottom thereof, a lint tube associated with said space and having an inlet opening thereinto at approximately the level of the axis of said saws, suction means applied to said tube for drawing lint upwardly therein, a heavy mote receiver and conveyor unit mounted within said space above the level of the axis of said saws, said unit constituing the upper wall of said inlet opening, said receiver including a baffle, said baffle extending from said wall structure at a point above the axis of said saws around said conveyor and upwardly toward said saws and defining thereabove a heavy moting space to which heavy motes are discharged from the saws by centrifugal force and further defining between the saw drum and the baffle an air draft passage through which air is drawn in the direction of rotation of said saws, said wall structure extending in an inclined direction downwardly from said unit baffle and defining an air passage between itself and the saw drum in which air is drawn past the saw teeth in a direction opposite to the direction of rotation of said saws, said wall terminating at its lower end in a lighter mote discharge opening including an adjustable air inlet baffle therefor.

9. In a cottonseed linter employing a saw drum and a plurality of saws mounted thereon together with a linter breast with a series of ribs between which the saws extend and are adapted to be rotated to strip lint from seeds, a wall structure providing a substantially open space to the rear of said breast around said saws and drum and extending from the top of said breast to the bottom thereof, a lint tube associated with said space and having an inlet opening thereinto at approximately the level of the axis of said saws, suction means applied to said tube for drawing lint upwardly therein, a heavy mote receiver and conveyor unit mounted within said space above the level of the axis of said saws, said unit constituting the upper wall of said inlet opening, said receiver including a baffle, said baffle extending from said wall structure at a point above the axis of said saws around said conveyor and upwardly toward said saws and defining thereabove a heavy moting space to which heavy motes are discharged from the saws by centrifugal force and further defining between the saw drum and the baffle an air draft passage through which air is drawn in the direction of rotation of said saws, said wall structure extending in an inclined direction downwardly from said unit baffle and defining an air passage between itself and the saw drum in which air is drawn past the saw teeth in a direction opposite to the direction of rotation of said saws, a light mote receiving chamber including an adjustable air inlet in said wall structure, said wall structure terminating at its lower end in a lighter mote discharge opening including an adjustable air inlet baffle therefor whereby said space formed by said wall structure constitutes a chamber having three independent moting areas.

JOHN C. ROGERS.
REDDING SIMS.